(12) United States Patent
Alexander et al.

(10) Patent No.: US 7,070,238 B1
(45) Date of Patent: Jul. 4, 2006

(54) CUSTOM-MOLDABLE SEATING PRODUCT AND METHOD FOR USING SAME

(75) Inventors: Cherie Alexander, York, SC (US); John Arendt, Charlotte, NC (US)

(73) Assignee: Britax Child Safety, Inc., Charlotte, NC (US)

( * ) Notice: Subject to any disclaimer, the term of this patent is extended or adjusted under 35 U.S.C. 154(b) by 0 days.

(21) Appl. No.: 11/190,156

(22) Filed: Jul. 26, 2005
(Under 37 CFR 1.47)

(51) Int. Cl.
*A47D 1/10* (2006.01)
*A47C 31/11* (2006.01)
*B65D 25/08* (2006.01)
*B65B 23/00* (2006.01)

(52) U.S. Cl. ............ 297/219.12; 297/219.1; 297/250.1; 297/256.16; 206/219; 206/524; 53/472

(58) Field of Classification Search ............ 297/250.1, 297/219.12, 256.17, 256.15, 219.1, 256.16; 206/219, 524; 53/450, 472
See application file for complete search history.

(56) References Cited

U.S. PATENT DOCUMENTS

| | | | |
|---|---|---|---|
| 5,482,352 A * | 1/1996 | Leal et al. ............... | 297/217.4 |
| 5,699,902 A | 12/1997 | Sperry et al. | |
| 5,873,221 A | 2/1999 | Sperry et al. | |
| 5,899,325 A | 5/1999 | Bertram et al. | |
| 5,996,782 A | 12/1999 | Sperry et al. | |
| 6,237,998 B1 * | 5/2001 | Aprile ............ | 297/219.12 |
| 6,676,210 B1 * | 1/2004 | Peyton ............ | 297/219.12 |
| 6,702,381 B1 * | 3/2004 | Endicott et al. ....... | 297/256.17 |
| 6,752,457 B1 * | 6/2004 | Gold et al. ........... | 297/219.12 |
| 6,764,134 B1 * | 7/2004 | Crescenzi et al. ..... | 297/219.12 |
| 6,787,510 B1 | 9/2004 | Santos et al. | |

* cited by examiner

Primary Examiner—Rodney B. White
Assistant Examiner—Stephen Vu
(74) Attorney, Agent, or Firm—Adams Evans P.A.

(57) ABSTRACT

A custom moldable seating product includes a seat having a seat bottom and a seat back, and a moldable element for being carried by the seat. The moldable element is transformable from an initially flexible unactivated state to an activated state, such that the moldable element conforms to a seat occupant positioned on the seat. The moldable element may include a first component contained in a first compartment and a second component contained in a second compartment. The first and second compartments may be contained in an initially flexible enclosure. The first and second compartments may be ruptured to allow the first and second components to mix within the enclosure. The reaction of the first and second components create an expandable foam that conforms to a body part of a seat occupant positioned on the seat.

21 Claims, 12 Drawing Sheets

CUSTOM-MOLDABLE SEATING PRODUCT AND METHOD FOR USING SAME

TECHNICAL FIELD AND BACKGROUND OF THE INVENTION

This invention relates to a custom-moldable seating product. In particular, the invention has application as a vehicle safety seat for children wearing orthopedic devices, such as hip spica casts.

Custom-moldable seats are used in various applications for providing comfort, support, and safety to an individual. One example where a custom-moldable seat is particularly useful is in the transportation of an injured child. Transportation of an injured child can be especially difficult when the child is fitted with an orthopedic device, such as a hip spica cast. All fifty states and the District of Columbia have child restraint laws requiring children to travel in approved child restraint devices. However, positioning a child fitted with a hip spica cast in a conventional child seat can be difficult and uncomfortable for the child.

A hip spica cast is used to keep the child's hips and legs from moving relative to each other. Several types of hip spica casts exist. One type extends from the chest to the child's toes. Another type may enclose the legs, or enclose one entire leg and down to the hip or knee of the other leg. A child in a hip spica cast should be maintained in a semi-sitting position to allow optimal positioning of the hips. Also, the child's feet and heels should be free of pressure caused by contact with a seat or other structure. As such, the transportation of a child fitted with a hip spica cast can be particularly challenging.

Currently, various devices and techniques are used to transport a child with a hip spica cast. For example, pillows may be used to prop a child and improve comfort in an existing child restraint design. However, the pillows can shift and are generally inadequate to provide proper positioning and support to the child. Furthermore, pillows could present a suffocation hazard. Special safety seats have also been developed for children in a hip spica cast, but require a parent to purchase a second car seat, resulting in a substantial expense for a limited time of use. Another method of transporting a child with a hip spica cast is to lay the child flat on the back seat of a vehicle. However, this method has several disadvantages, as well. For example, standard seat belts are used to secure the child to the seat, resulting in less than optimal restraint for the child. Also, pillows may be required to position the child properly, as well as, reduce pressure on the feet and heels caused by the seat. Furthermore, such a method is likely to violate state child restraint laws.

The present invention overcomes the disadvantages of the prior art by providing an efficient, comfortable, and safe means for transporting a person wearing orthopedic devices.

SUMMARY OF THE INVENTION

Therefore, it is an object of the invention to provide a custom-moldable seating product.

It is another object of the invention to provide a seating product customized to accommodate an immobilized or otherwise injured person.

It is another object of the invention to provide a child safety seat customized to provide proper positioning, comfort and safety to a child fitted with an orthopedic device.

These and other objects of the present invention are achieved in the preferred embodiments disclosed below by providing a custom moldable seating product including a seat having a seat bottom and a seat back and adapted for being positioned on and secured to a vehicle. The moldable element cooperates with the seat bottom and seat back of the seat to provide a custom-molded support to a seat occupant. The moldable element comprising an enclosure containing an initially-flexible, relatively low-volume material and an activatable chemical system for being positioned between the seat occupant and the seat. The activating of the chemical system produces a relatively rigid, relatively high-volume material conformed to adjacent body areas of the seat occupant and the seat.

According to one preferred embodiment of the invention, the moldable element includes a first component contained in a first compartment of the enclosure and a second component contained in a second compartment of the enclosure According to another preferred embodiment of the invention, the first and second compartments are rupturable to allow the first and second components to mix within the enclosure. The reaction of the first and second components create an expandable foam for conforming to the adjacent body areas of the seat occupant and the seat.

According to yet another preferred embodiment of the invention, the first component comprises an isocyanate, the second component comprises a polyol. Further, the first and second compartments are rupturable to allow the isocyanate and polyol to mix within the enclosure. The reaction of the isocyanate and the polyol produces a polyurethane foam that conforms to the adjacent body areas of the seat occupant and the seat.

According to yet another preferred embodiment of the invention, the seating product includes a cover attachable to the seat. The cover including a pocket for positioning the moldable element therein.

According to yet another preferred embodiment of the invention, the moldable element is a cover for being attached to the seat.

According to yet another preferred embodiment of the invention, the method for customizing a seat for a child includes the steps of providing a child safety seat having a seat bottom and a seat back, and providing a moldable element including an enclosure containing an initially flexible material in a relatively low-volume state. The moldable element is positioned in the seat, and the child is positioned in the seat and on the moldable element. The chemical system is activated to produce a relatively rigid, relatively high volume material conformed to adjacent body areas of the seat occupant and the seat.

In yet another preferred embodiment of the invention, the method includes activating the chemical system by rupturing the first and second compartments to allow the first and second components to mix within the enclosure, creating an expandable foam for conforming to the adjacent body areas of the seat occupant and seat.

In yet another preferred embodiment of the invention, the method includes positioning the moldable element between the legs of the seat occupant.

In yet another preferred embodiment of the invention, the method includes positioning the seat occupant such that the seat occupant is standing on the seat bottom.

In yet another preferred embodiment of the invention, the method includes positioning the seat occupant in a recumbent position, and the moldable element resides in a space defined by the posterior side of the seat occupant and the seat.

According to yet another preferred embodiment of the invention, a seating kit includes a seat having a seat bottom and a seat back, and a moldable element for positioning on the seat. The moldable element is transformable from an initially flexible unactivated state. When activated, the moldable element conforms to a person positioned on the seat.

BRIEF DESCRIPTION OF THE DRAWINGS

Some of the objects of the invention have been set forth above. Other objects and advantages of the invention will appear as the invention proceeds when taken in conjunction with the following drawings, in which.

DETAILED DESCRIPTION OF THE PREFERRED EMBODIMENT AND BEST MODE

Figure 1:
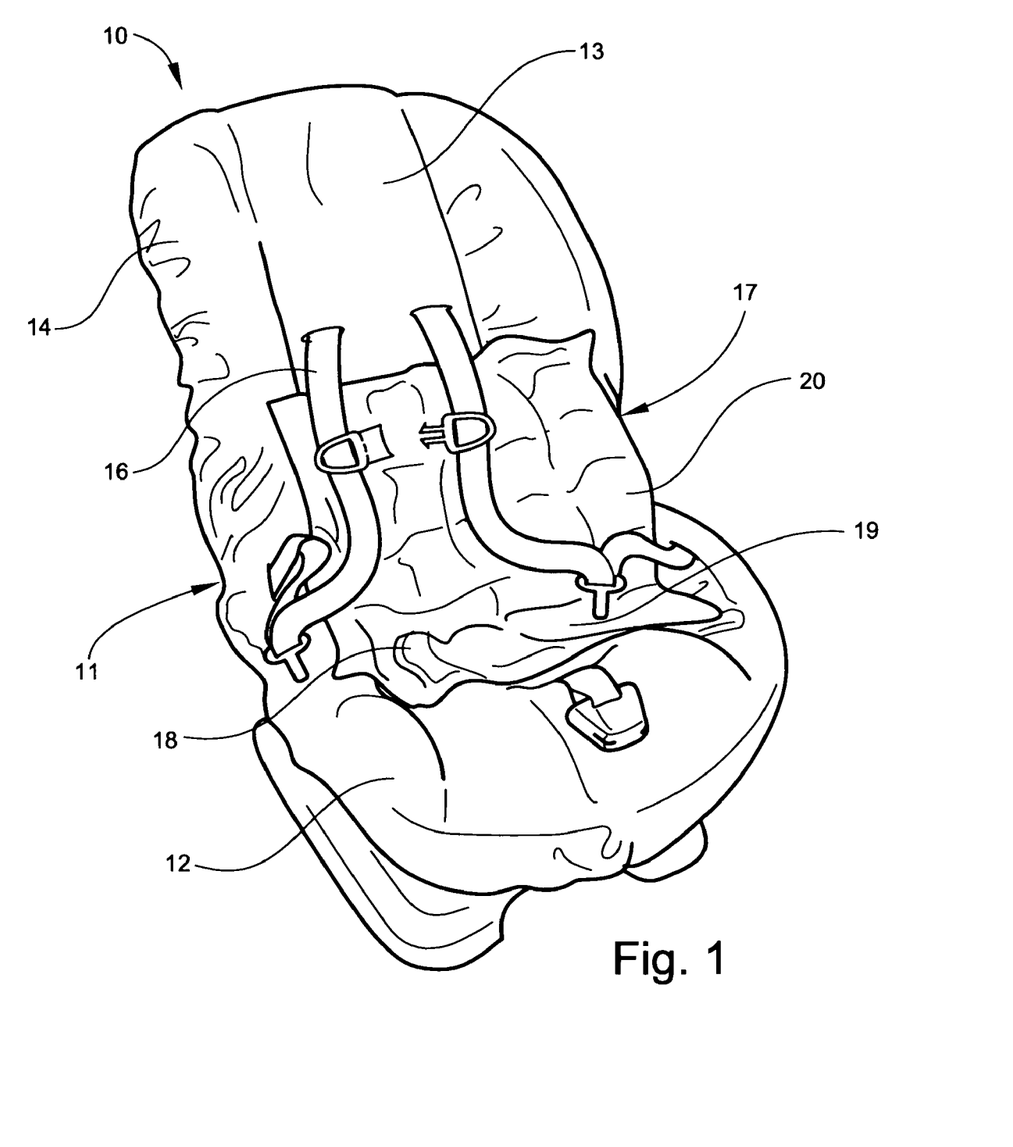
FIG. 1 is a perspective view of a custom-moldable seat according to a preferred embodiment of the invention.

Referring now specifically to the drawings, a custom-moldable seating product according to a preferred embodiment of the invention is illustrated in FIG. 1, and shown generally at reference numeral 10. The seating product 10 includes a seat 11, and a moldable element 17.

The seat 11 includes a seat bottom 12, a seat back 13, and a cover 14 for covering the seat 11. A harness 16 is attached to the seat back 13 for connecting to the seat bottom 12 to securely strap a seat occupant into the seating product 10.

A moldable element 17 is positioned on the seat 11. The moldable element 17 can be a "foam in bag" system, such as is disclosed in U.S. Pat. Nos. 5,699,902, 5,873,221, 5,899,325, and/or 5,996,782, and sold by Sealed Air Corporation under the name INSTAPAK QUICK Foam Packaging. The moldable element 17 includes a chemical system that when activated produces a relatively rigid foam that conforms to the contours of a space within which it is confined.

Figure 2:
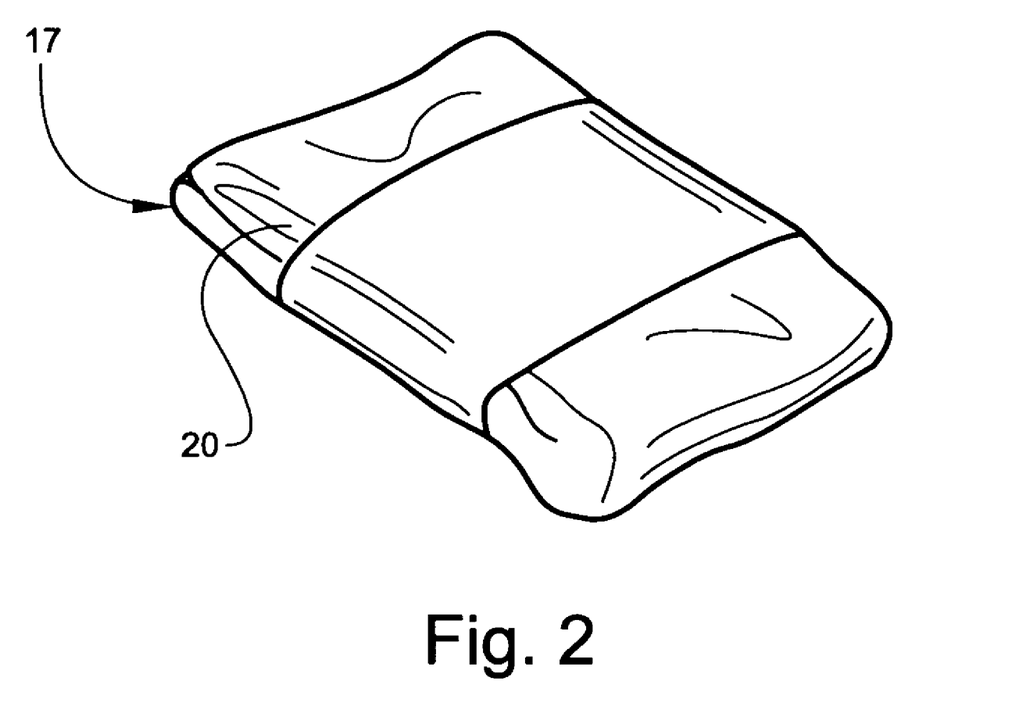
FIG. 2 is a perspective view of a moldable element according to a preferred embodiment of the invention, shown in its initially wrapped and inactivated state.
Figure 3:
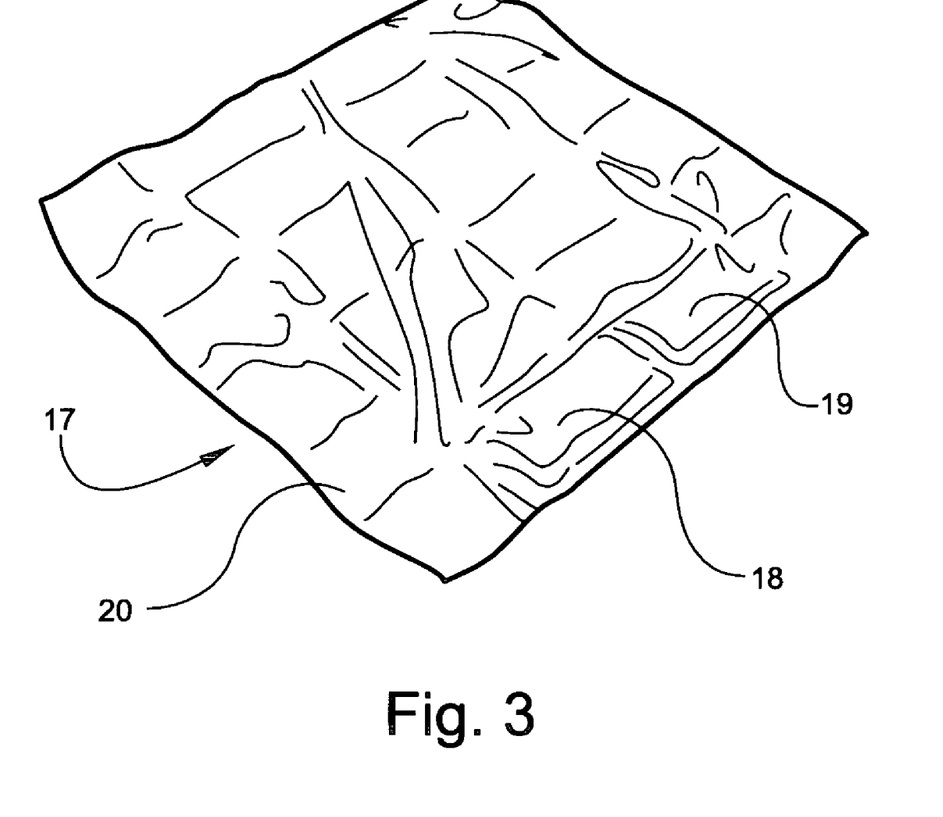
FIG. 3 is a perspective view of the moldable element of FIG. 2, shown unwrapped in anticipation of activation.

As shown in FIG. 2, the moldable element 17 can be folded and tightly packaged for convenient transport in an initially unactivated state. Prior to activation, the moldable element 17 is unfolded as shown in FIG. 3. The moldable element 17 includes a first compartment 18 and a second compartment 19 contained in an initially flexible envelope 20. The first compartment 18 contains a first foam precursor component, and the second compartment 19 contains a second foam precursor component of a two-part foaming system. The first and second components are maintained in their respective compartments 18, 19 in a stable, unactivated state.

Figure 4:
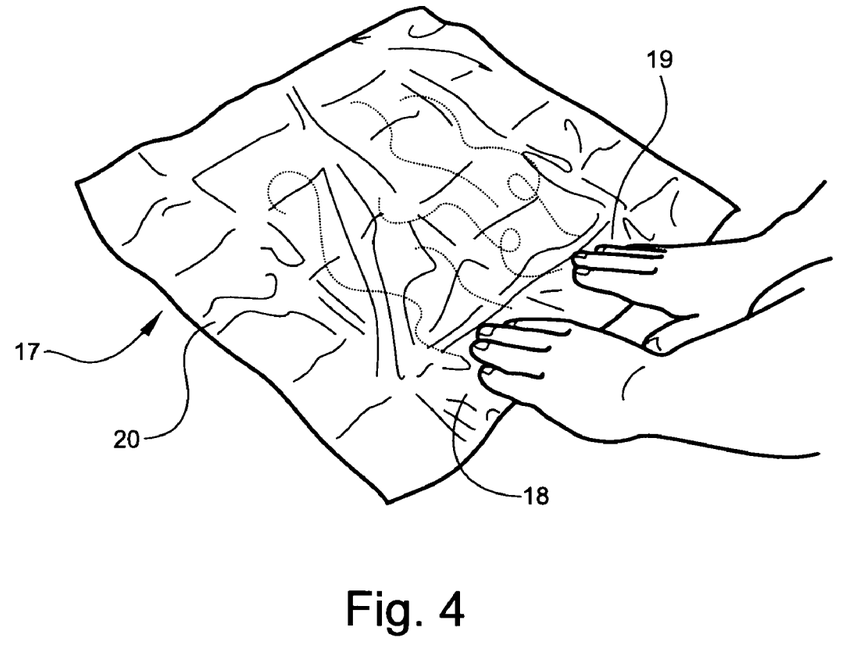
FIG. 4 is a perspective view of the moldable element of FIG. 2, shown being activated by a user pressing first and second compartments.

The first and second compartments 18, 19 are rupturable to allow the first and second components to mix within the envelope 20, thereby activating the moldable element 17. The first and second compartments 18, 19 can be ruptured by a user pressing down on the compartments 18, 19 with his hands, as shown in FIG. 4. Reaction of the first and second components produces foam that expands throughout the envelope 20 until the reaction is complete. The first and second components of the chemical system may be an isocyanate and a polyol that produce a polyurethane foam when mixed together.

Figure 5:
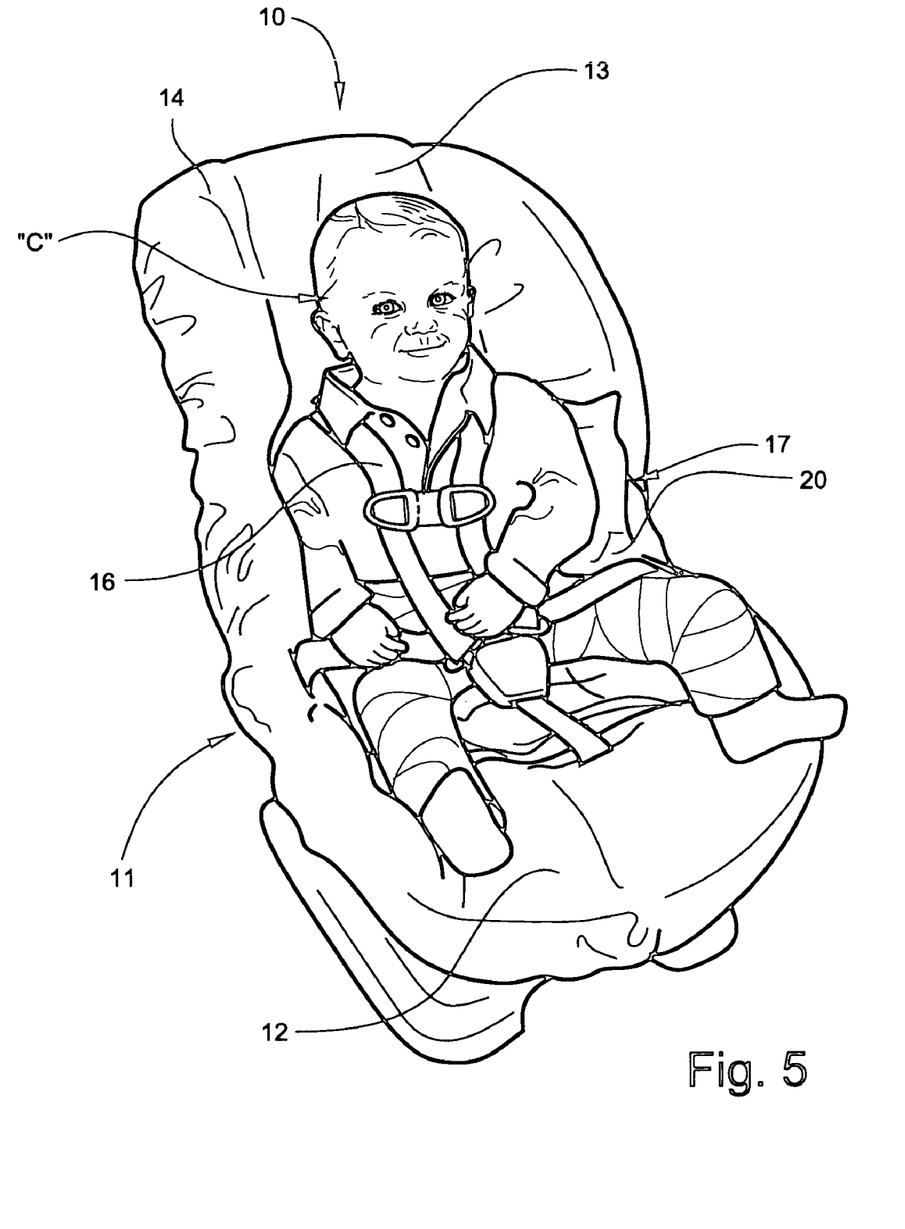
FIG. 5 is a perspective view of the seat of FIG. 1, shown with a child in a hip spica cast seated on an unactivated moldable element.
Figure 6:
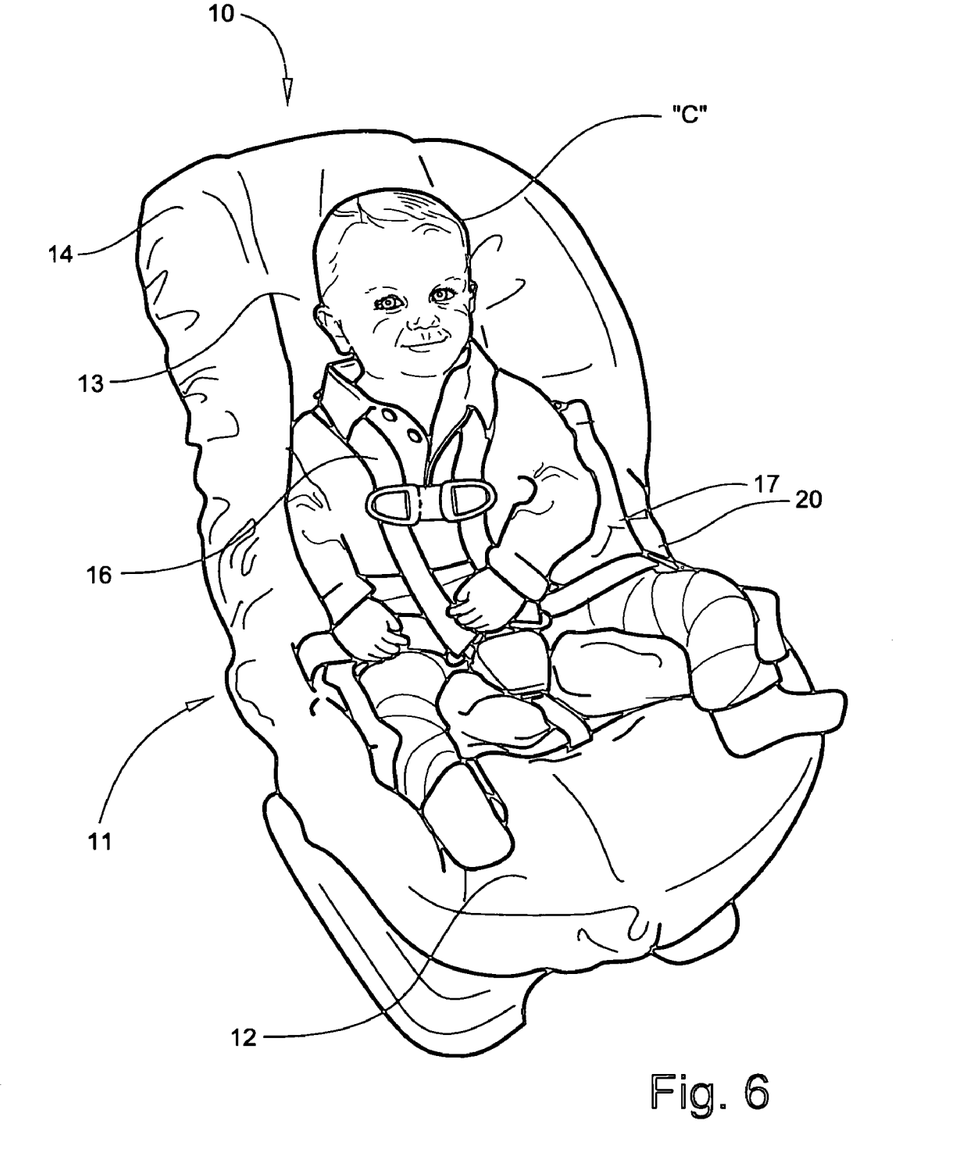
FIG. 6 is a perspective view of the seat of FIG. 1, shown with the child seated on an activated moldable element.

FIGS. 5 and 6 illustrate a method for using the seating product 10. The initially flexible unactivated moldable element 17 is positioned on the seat 11, and a person, such as child "C", is positioned on the moldable element 17 in a sitting position. Once the child "C" is properly positioned, the first and second compartments 18, 19, shown in FIG. 1, are ruptured to allow the first and second components to mix. As the first and second components mix, they react and create the foam that expands around the body of child "C", filling any voids between the seat 11 and the child "C" and creating a custom fitted seat, as shown in FIG. 6.

Figure 7:
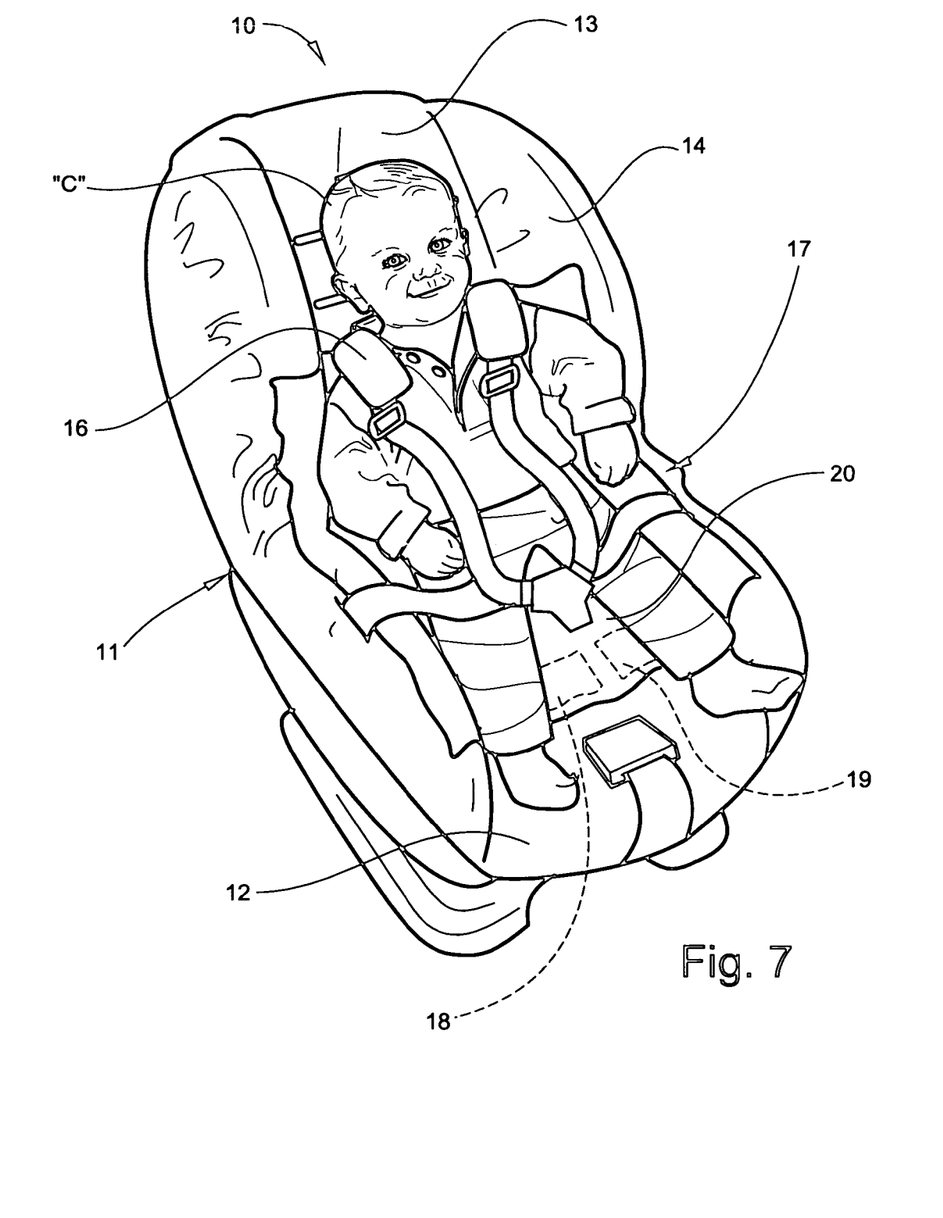
FIG. 7 is a perspective view of the seat of FIG. 1, shown with a child in a recumbent position on an unactivated moldable element.
Figure 8:
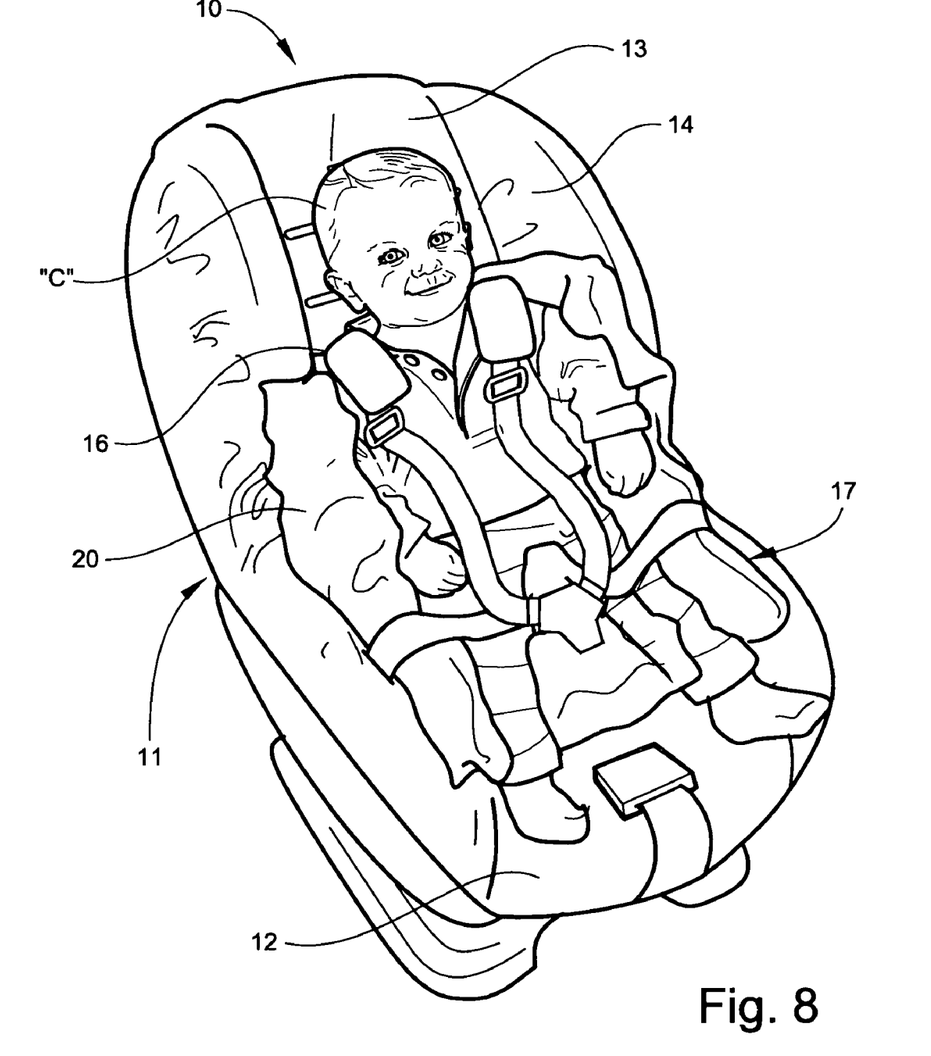
FIG. 8 is a perspective view of the seat of FIG. 1, shown with the child in a recumbent position on an activated moldable element.

FIGS. 7 and 8 illustrate an alternative method for using the seating product 10. A child "C" can be positioned in a semi-upright or recumbent position, in which the child's feet are hanging over the front edge of the seat bottom 12 and the child's head is against the seat back 13, thus creating a large void between the child "C" and the seat 11. The child "C" may need to be placed in such a position due to a physical condition. For example, the child "C" may be wearing an orthopedic or other medical apparatus that prevents the child "C" from sitting in a normal seated position, and requires the child "C" to be in a recumbent position. In such a position, the moldable element 17 expands to fill the large void between the child "C" and the seat 11, as well as a void between the legs of the child "C", as shown in FIG. 8. The cured foam provides a custom shaped cushion that minimizes movement of the child "C" with the seat 11. As such, the seating product 10 is particularly useful as a vehicle safety seat for a child wearing an orthopedic device, such as a hip spica cast, or having any medical condition requiring immobilization.

Figure 9:
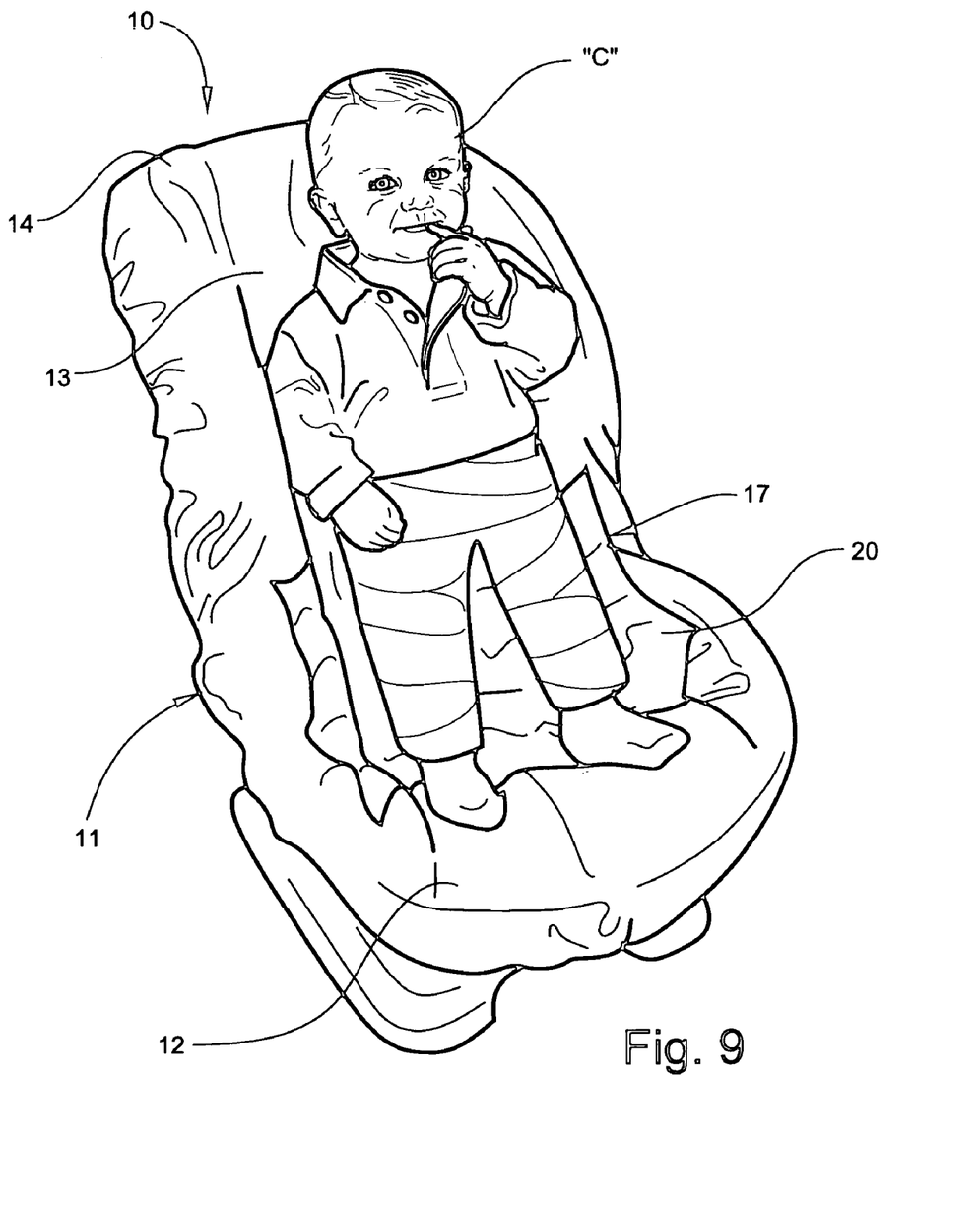
FIG. 9 is a perspective view of the seat of FIG. 1, shown with a child standing on the seat and an unactivated moldable element positioned between the child and the seat.
Figure 10:
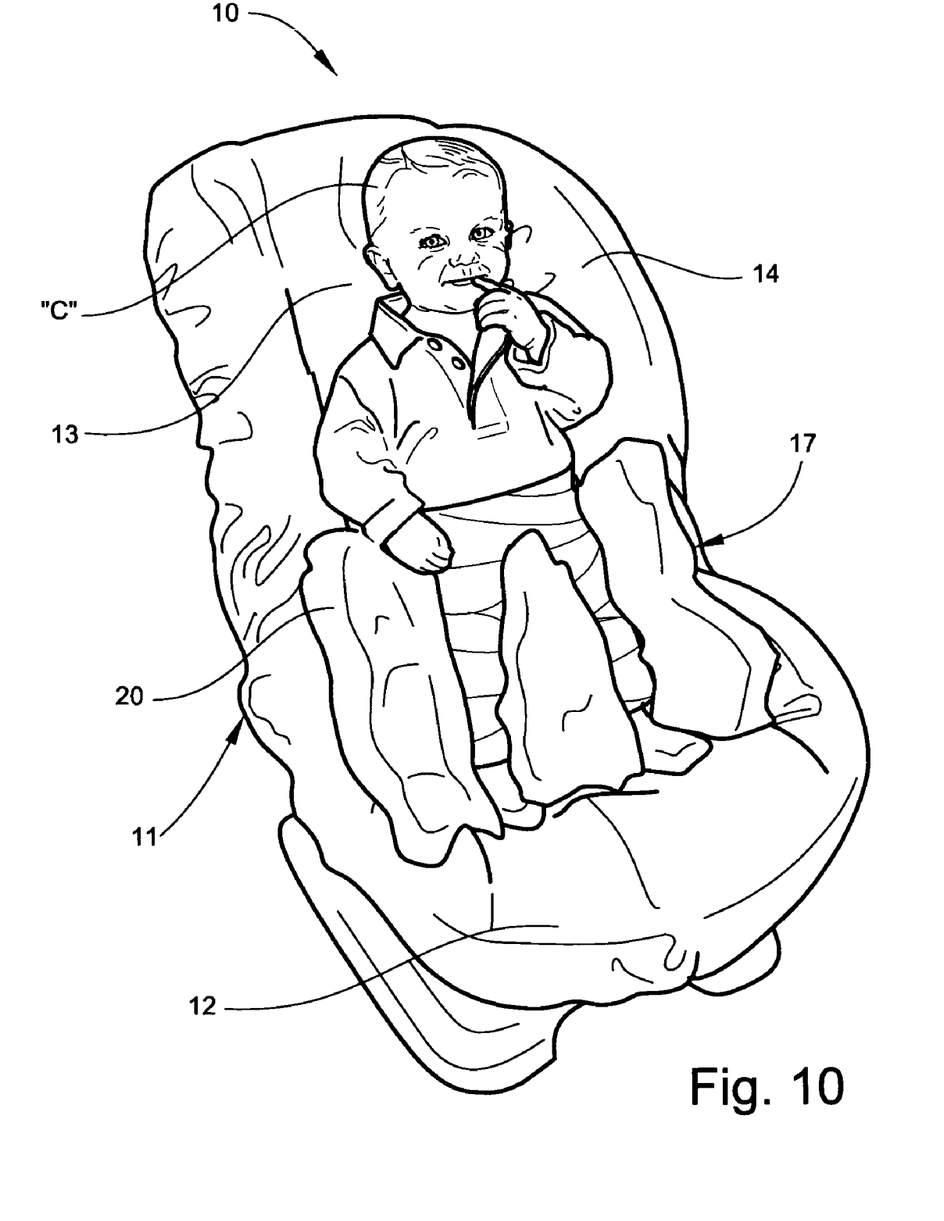
FIG. 10 is a perspective view of the seat of FIG. 1, shown with the child standing on the seat, and an activated moldable element positioned between the child and the seat, and the legs of the child.

Yet another method for using the seating product 10 is illustrated in FIGS. 9 and 10. The child "C" is positioned in a standing position on the seat bottom 12 of the seat 11. In this position, the moldable element 17 is positioned between the legs of the child "C" and against both the seat back 13 and the seat bottom 12. The moldable element 17 is activated by mixing the first and second components to create the expandable foam, which fills in voids between the child "C" and the seat 11, and the void between the child's legs, as shown in FIG. 10. The child "C" is thus supported over a relatively large surface area, the moldable element 17 acting as a saddle to comfortably support the child "C." The harness has been omitted in FIGS. 9 and 10 for clarity.

The invention provides a relatively inexpensive means for transporting a child "C" with a hip spica or other medical device. The moldable element 17 can be used with any conventional child safety seat, thereby eliminating the need to purchase a specially constructed safety seat that will be used by the child only for the limited time that he wears the cast. In addition, the seating product 10 can include multiple moldable elements 17 so that the moldable element 17 in the seat 10 can be frequently replaced as the positioning needs of the child "C" change or as the child grows, in order to enhance the fit and comfort to the child "C". Furthermore, the invention is highly sanitary as the envelope 20 of the moldable element 17 can be constructed of plastic or other similar material that is easily cleaned, and can be disposed of with ordinary waste.

Figure 11:
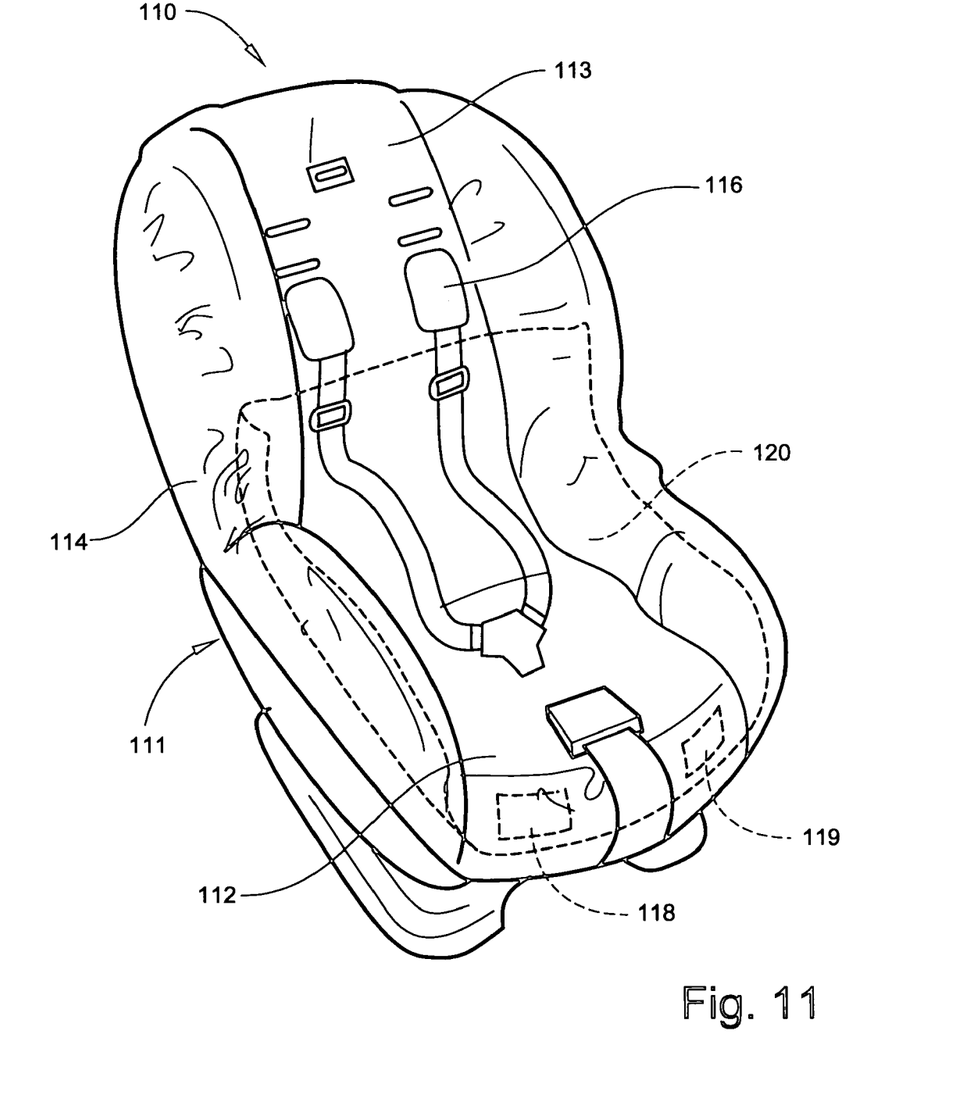
FIG. 11 is a perspective view of a custom moldable seat according to another preferred embodiment of the invention.

In an alternative embodiment shown generally at reference numeral 110 in FIG. 11, a moldable element is integrally formed within a cover 114. The cover 114 includes a first compartment 118, a second compartment 119, and an interior void 120 for receiving the expandable foam upon reaction of the first and second components. The seat 111 includes a seat bottom 112 and a seat back 113. A harness 116 is attached to the seat back 113 for connecting to the seat bottom 112.

Figure 12:
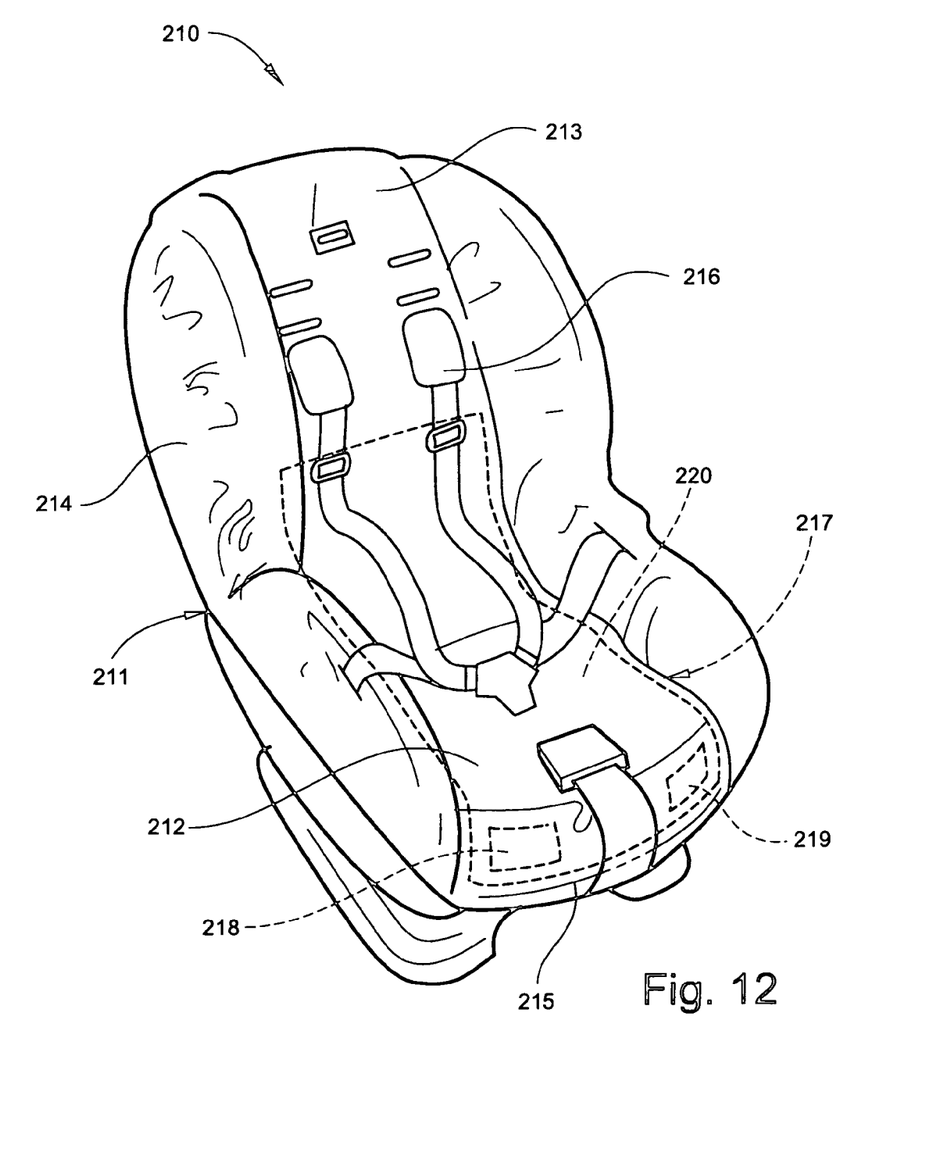
FIG. 12 is a perspective view of a custom moldable seat according to yet another preferred embodiment of the invention.

In another embodiment illustrated in FIG. 12 and shown generally at reference numeral 210, the seat 210 includes a cover 214 with an interior pocket 215 for receiving a moldable element 217. The moldable element 217 includes a first compartment 218, a second compartment 219, and an initially flexible envelope 220. The seat 211 includes a seat bottom 212 and a seat back 213. A harness 216 is attached to the seat back 213 for connecting to the seat bottom 212.

A custom moldable seating product and methods for using same are described above. Various details of the invention may be changed without departing from its scope. For example, it is contemplated that the steps of the methods of the invention can be carried out in varying order, and the invention is not limited to the particular order of steps recited herein. Furthermore, the foregoing description of the preferred embodiments of the invention and the best mode for practicing the invention are provided for the purpose of illustration only and not for the purpose of limitation, the invention being defined by the claims.

We claim:

1. A custom moldable seating product, comprising:
    (a) a seat having a seat bottom and a seat back, and adapted for being positioned on and secured to a vehicle; and
    (b) a moldable element for cooperating with the seat bottom and seat back of the seat to provide a custom-molded support to a seat occupant, the moldable element comprising an enclosure containing an initially-flexible, relatively low-volume material and an activatable chemical system for being positioned between the seat occupant and the seat, wherein activating the chemical system produces a relatively rigid, relatively high-volume material conformed to adjacent body areas of the seat occupant and the seat.

2. The seating product according to claim 1, wherein the moldable element includes a first component contained in a first compartment of the enclosure and a second component contained in a second compartment of the enclosure.

3. The seating product according to claim 2, wherein the first and second compartments are rupturable to allow the first and second components to mix within the enclosure, wherein reaction of the first and second components create an expandable foam for conforming to the adjacent body areas of the seat occupant and the seat.

4. The seating product according to claim 2, wherein the first component comprises an isocyanate, the second component comprises a polyol, and further wherein the first and second compartments are rupturable to allow the isocyanate and polyol to mix within the enclosure, whereby reaction of the isocyanate and the polyol produces a polyurethane foam for conforming to the adjacent body areas of the seat occupant and the seat.

5. The seating product according to claim 1, and further comprising a cover attachable to the seat, the cover including a pocket for positioning the moldable element therein.

6. The seating product according to claim 1, wherein the moldable element comprises a cover for being attached to the seat.

7. A method for customizing a seat for a seat occupant, comprising the steps of:
    (a) providing a child safety seat having a seat bottom and a seat back;
    (b) providing a moldable element including an enclosure containing an initially flexible material in a relatively low-volume state and a chemical system;
    (c) positioning the moldable element in the seat;
    (d) positioning a seat occupant in the seat and on the moldable element; and
    (e) activating the chemical system to produce a relatively rigid, relatively high volume material conformed to adjacent body areas of the seat occupant and the seat.

8. The method according to claim 7, wherein the moldable element includes a first component in a first compartment of the enclosure and a second component in a second compartment of the enclosure.

9. The method according to claim 8, wherein the step of activating the chemical system includes rupturing the first and second compartments to allow the first and second components to mix within the enclosure, creating an expandable foam for conforming to the adjacent body areas of the seat occupant and seat.

10. The method according to claim 8, wherein the first component comprises an isocyanate, the second component comprises a polyol, and further wherein the step of activating the moldable element includes rupturing the first and second compartments to allow the isocyanate and the polyol to mix within the enclosure, whereby reaction of the isocyanate and polyol produces a polyurethane foam for conforming to the adjacent body areas of the seat occupant and seat.

11. The method according to claim 7, wherein the step of positioning a seat occupant on the moldable element further comprises the step of positioning the moldable element between the legs of the seat occupant.

12. The method according to claim 7, wherein the step of positioning the seat occupant on the moldable element comprises positioning the seat occupant such that the seat occupant is standing on the seat bottom.

13. The method according to claim 7, wherein the step of positioning the seat occupant on the moldable element comprises positioning the seat occupant in a recumbent position, the moldable element residing in a space defined by the posterior side of the seat occupant and the seat.

14. A seating kit, comprising:
(a) a seat having a seat bottom and a seat back, and adapted for being positioned on and secured to a vehicle; and
(b) a moldable element for positioning on the seat bottom and seat back of the seat to provide a custom-molded support to a seat occupant, the moldable element comprising an enclosure containing an initially-flexible, relatively low-volume material and an activatable chemical system for being positioned between the seat occupant and the seat, wherein activating the chemical system produces a relatively rigid, relatively high-volume material conformed to adjacent body areas of the seat occupant and the seat.

15. The seating kit according to claim 14, wherein the moldable element includes a first component in a first compartment of the enclosure and a second component in a second compartment of the enclosure.

16. The seating kit according to claim 15, wherein the first and second compartments are rupturable to allow the first and second components to mix within the enclosure, creating an expandable foam for conforming to the adjacent body areas of the seat occupant and the seat.

17. The seating kit according to claim 15, wherein the first component comprises an isocyanate, the second component comprises a polyol, and further wherein the first and second compartments are rupturable to allow the isocyanate and polyol to mix within the enclosure, whereby reaction of the isocyanate and the polyol produces a polyurethane foam for conforming to the adjacent body areas of the seat occupant and the seat.

18. The seating kit according to claim 14, and further comprising a cover attachable to the seat, the cover including a pocket for positioning the moldable element therein.

19. The seating kit according to claim 14, wherein the moldable element comprises a cover for being attached to the seat.

20. The seating kit according to claim 14, further comprising a set of instructions associated with the seating kit, the instructions including the steps of:
(a) positioning the moldable element in the seat;
(b) positioning a seat occupant in the seat and on the moldable element; and
(c) activating the chemical system to produce the relatively rigid, relatively high volume material conformed to the adjacent body areas of the seat occupant and the seat.

21. In a vehicle safety seat having a seat bottom and a seat back, and adapted for being positioned on and secured to a vehicle safety seat, the improvement comprising a moldable element for cooperating with the seat bottom and seat back of the seat to provide a custom-molded support to a seat occupant, the moldable element comprising an enclosure containing an initially-flexible, relatively low-volume material and a chemical system for being positioned between the seat occupant and the seat and activated to produce a relatively rigid, relatively high-volume material conformed to adjacent body areas of the seat occupant and seat.

* * * * *